(12) United States Patent
Maki

(10) Patent No.: US 6,446,392 B1
(45) Date of Patent: Sep. 10, 2002

(54) WINDOW WEATHERSTRIP FOR MOTOR VEHICLES

(75) Inventor: Renji Maki, Brookville, OH (US)

(73) Assignee: Green Tokai Co., Ltd., Brookville, OH (US)

( * ) Notice: Subject to any disclaimer, the term of this patent is extended or adjusted under 35 U.S.C. 154(b) by 0 days.

(21) Appl. No.: 09/812,656

(22) Filed: Mar. 20, 2001

Related U.S. Application Data

(60) Provisional application No. 60/233,885, filed on Sep. 20, 2000.

(51) Int. Cl.[7] .............................. B60J 1/16; E05F 11/38
(52) U.S. Cl. .......................... 49/377; 49/441; 49/490.1
(58) Field of Search ....................... 49/377, 441, 490.1, 49/492.1, 493.1, 484.1

(56) References Cited

U.S. PATENT DOCUMENTS

| 3,883,993 | A | * | 5/1975 | Pullan | 49/490 |
| 4,015,398 | A | * | 4/1977 | Bright | 52/716 |
| 4,678,227 | A | * | 7/1987 | Castagno | 296/213 |
| 4,696,128 | A | | 9/1987 | Fukuhara | |
| 4,757,643 | A | * | 7/1988 | Boots | 49/488 |
| 4,949,507 | A | | 8/1990 | Vaughan | |
| 5,005,317 | A | | 4/1991 | Saint-Louis Augustin et al. | |
| 5,014,646 | A | * | 5/1991 | Dupuy et al. | 49/440 |
| 5,388,371 | A | | 2/1995 | Nozaki | |
| 5,493,814 | A | | 2/1996 | Christian | |
| 5,529,650 | A | | 6/1996 | Bowers et al. | |
| 5,544,448 | A | | 8/1996 | Mass | |
| 5,775,030 | A | * | 7/1998 | Hamabata | 49/377 |
| 5,799,442 | A | | 9/1998 | Takahashi et al. | |
| 5,870,860 | A | | 2/1999 | Heller | |
| 5,913,762 | A | | 6/1999 | Matsumoto | |
| 5,970,659 | A | * | 10/1999 | Oord | 49/377 |
| 6,070,363 | A | | 6/2000 | Vance | |
| 6,082,048 | A | * | 7/2000 | Backes et al. | 49/377 |
| 6,282,840 | B1 | * | 9/2001 | Vance | 49/377 |

* cited by examiner

Primary Examiner—Robert W. Gibson, Jr.
(74) Attorney, Agent, or Firm—Biebel & French

(57) ABSTRACT

A window weatherstrip that can be clipped onto a mounting structure of a motor vehicle door frame adjacent an opening containing a window glass such that the weatherstrip can be completely hidden from view thereby avoiding the need for any decorative type finish. More specifically, the window weatherstrip is clipped onto a mounting structure having a horizontally extending mounting flange integrally connected with a downwardly projecting vertical mounting flange such that the weatherstrip can be completely hidden from view underneath a door liner.

9 Claims, 3 Drawing Sheets

WINDOW WEATHERSTRIP FOR MOTOR VEHICLES

RELATED APPLICATION

This application claims the benefit of U.S. Provisional Application No. 60/233,885 filed Sep. 20, 2000.

FIELD OF THE INVENTION

This invention relates to a window weatherstrip such as a bottom window weatherstrip, that can be easily clipped onto a mounting structure of a moor vehicle door frame adjacent an opening containing a window such that the mounting structure of the weatherstrip can be completely hidden from view thereby avoiding the need for any decorative type finish thereon.

BACKGROUND OF THE INVENTION

A multitude of window weatherstrips for sealing against the window of a motor vehicle have been provided over the years. Weatherstrips tend to be either extruded or roll-formed by manufacturing processes that involve numerous steps and generally are made from a combination of thermoset elastomer or thermoplastic and thermoplastic elastomer. Oftentimes, a metal core strip is provided and is covered with an extruded layer of elastomeric material to form a weatherstrip molding laving added strength and support.

The weatherstrips usually contain one or more sealing lips which bear against the inside and/or outside portion of the window to provide a seal against water, moisture, and dirt, to strip water from a reciprocating window, and to provide sound insulation. Typically, the sealing lips are made of a flexible elastomeric material while one side thereof may be flocked to provide a low friction coating for reducing friction between the lip and the movable window and to reduce squeaking.

Window weatherstrips are often exposed to view thereby requiring that the show surfaces of same be provided with some aesthetic or ornamental treatment. This treatment or special coating adds to the cost of part manufacture. It is accordingly desirable to provide a weatherstrip whose attachment or mounting structure is hidden from sight so that elaborate decorative treatments need not be applied to the part.

Additionally, in many cases, proper mounting of the weatherstrip to the door frame or other mounting structure requires the use of fasteners such as rivets, clips, and bendable tabs and the like and cooperating structures in the mounting structure. There is accordingly a need in the art for a window weatherstrip that can be easily attached to its associated mounting structure with a convenient snap fit.

SUMMARY OF THE INVENTION

In accordance with the invention, a window weatherstrip is provided that is readily snap fit onto the mounting structure of a motor vehicle door frame or the like. The weatherstrip comprises an inner flange and an outer flange, with the outer flange facing the window, preferably door window of the motor vehicle.

An intermediate portion connects the inner and outer flanges and is adapted to snap fit atop a horizontal mounting flange of the door frame member. The inner flange extends downwardly from the intermediate portion and, similarly, the outer flange extends downwardly from the intermediate portion of the weatherstrip in general parallel relation to the inner flange. The inner flange includes a terminal hooked end that extends inwardly toward the intermediate portion and is adapted to bear against a side of a vertical mounting flange of the door frame upon the snap fitting of the weatherstrip to the door frame mounting members.

The outer flange of the weatherstrip includes a top leg portion separated from a bottom leg portion by an intermediate offset portion. The offset portion extends laterally away from the door frame mounting members towards the window. The top leg portion of the outer flange includes an internal groove formed therein located underneath the intermediate portion of the weatherstrip. This groove faces toward the inner flange and is adapted for snug receipt of a horizontally extending mounting flange or the like therein.

The bottom leg portion of the outer flange includes a foot member that extends toward the inner flange and is adapted to bear against one of the vertical mounting flanges from the door on a side of the mounting flange opposite from that upon which the hooked bottom portion of the inner flange will bear.

At least one sealing lip extends from the offset portion of the outer flange toward the window member so as to provide for window sealing and easy reciprocation of the window. As is conventional in the art, the surfaces of the sealing lips that are to bear against the window may be flocked with textile fiber or other material having a low coefficient of friction.

Additionally, the bottom leg portion of the outer flange may be provided with an anchoring surface that extends obliquely relative to the foot member of the bottom leg portion. This anchoring surface is snugly received against a rail formed on the mounting structure.

A lock bump is formed on an underneath surface of the intermediate portion of the weatherstrip and cooperates with the groove formed on the outer flange top leg portion so as to frictionally engage or lock a horizontal mounting flange of the door frame therein.

The invention will be further described in conjunction with the following description and accompanying drawings.

DETAILED DESCRIPTION OF THE PREFERRED EMBODIMENT

Figure 3:
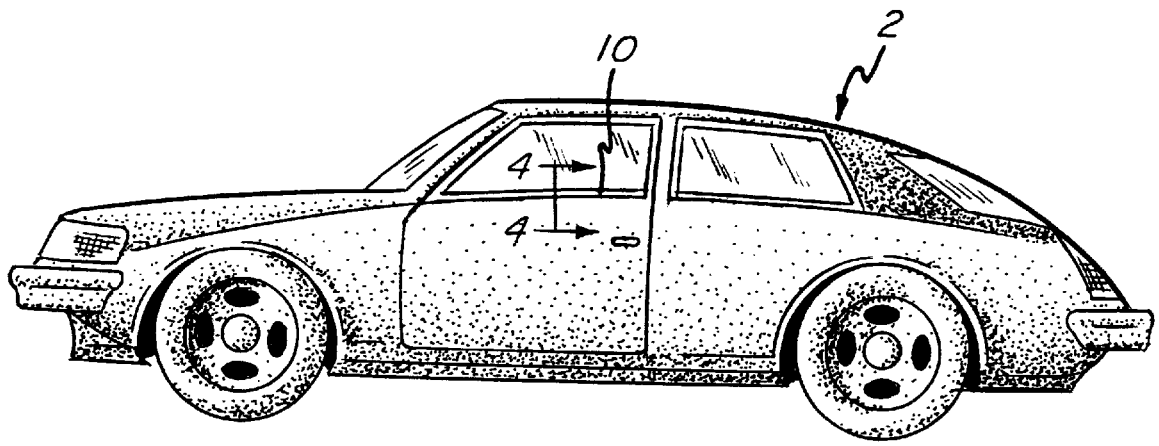
FIG. 3 is a side elevational view of an motor vehicle employing the window weatherstrip in accordance with the invention.
Figure 4:
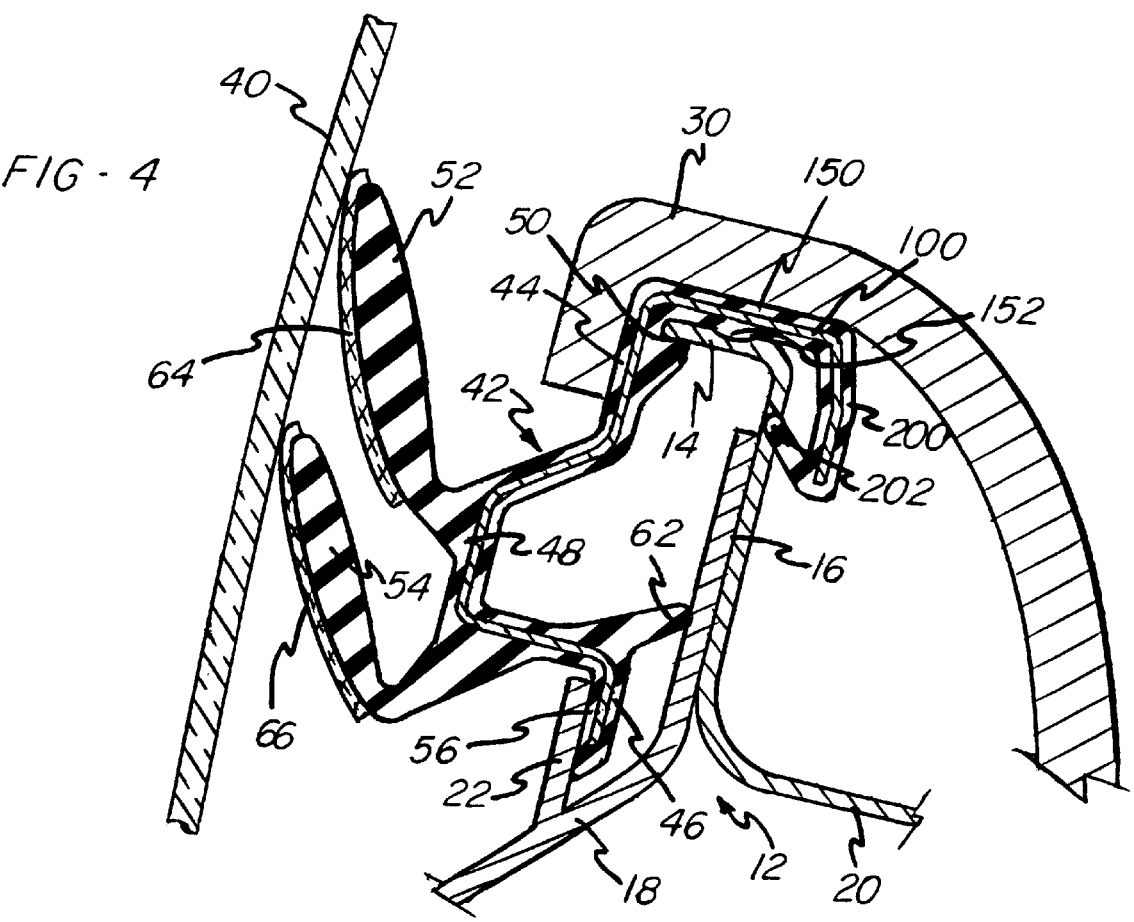
FIG. 4 is a sectional view taken along the plane represented by the lines and arrows 4—4 of FIG. 3.

Turning first to FIG. 3 of the invention, there is shown an automobile 2 of the type which may employ the window weatherstrip 10 in accordance with the invention. Turning now to FIG. 4, the weatherstrip 10 is mounted atop the door frame 12. Door frame 12 includes a mounting structure including horizontally extending mounting flange 14 which, at its terminal end, extends toward the window 40 of the motor vehicle 2. The horizontally extending mounting flange 14 is connected to the vertical mounting flange 16. Vertical mounting flange 16 comprises vertical section members 18, 20, which are welded, brazed, or suitably joined together. A vertically extending rail member 22 may be provided along the length of the weatherstrip 10 or, it can be provided intermittently along the length of the vertical mounting flange 16. As shown, the rail member 22 comprises a surface upon which a portion of the weatherstrip will bear so as to aid in the snap fitting of the weatherstrip over the horizontal mounting flange 14.

In the embodiment shown in FIG. 4, it is noted that the mounting structure of the weatherstrip is all located below the door liner 30. This is important in helping to reduce noise in the door panel. Also, since the mounting structure of the weatherstrip is provided underneath the door liner 30, there is no need to provide a special decorative show or ornamental surface on same.

The weatherstrip 10 comprises an outer flange 42 and inner flange 200. Both the outer flange 42 and inner flange 200 depend from the intermediate portion 150 of the weatherstrip 10 and extend downwardly therefrom. As shown, the inner flange 200 is shorter than the outer flange 42. The inner flange 200 terminates in a hooked portion 202 which extends inwardly toward the underneath portion of the intermediate member 150. The hooked portion 202 is adapted to bear against the vertical mounting flange 16.

Outer flange 42 comprises a top leg portion 44 separated from a bottom leg portion 46 by means of an intermediate offset section 48. The offset section 48 extends laterally from the top and bottom leg portions 44, 46 respectively, and extends obliquely toward the window member 40. The offset portion includes first and second sealing lips 52, 54, which are, in accordance with conventional technology, provided with flocking 64, 66 thereon to provide a low friction surface beating upon the window member 40.

As shown, tile bottom leg portion 46 of the outer flange 42 includes an inwardly facing foot member 62 which bears along the side of the vertical mounting flange 16 opposite from that upon which the hooked bottom 202 will impinge. Bottom leg portion 46 comprises a terminal anchoring surface 56 and a generally planar surface 47 extending at an obtuse angle relative to foot member 62. This surface 47 may be pivotally and securely locked against the inside portion of rail member 22 that is formed in the vertical section member 18. The intermediate portion 150 of the weatherstrip 10 is provided on its underneath side with a locking bump 152 proximate the groove 50 which groove 50 is formed in the top leg portion 44 of the outer flange 42. In combination the groove 50 and locking bump 152 serve to snappingly and fixedly lock the horizontally extending mounting flange 14 to the weatherstrip 10 assembly. As is conventional in the art, a metallic core 100 may be provided to increase the stability of the structure.

Figure 1:
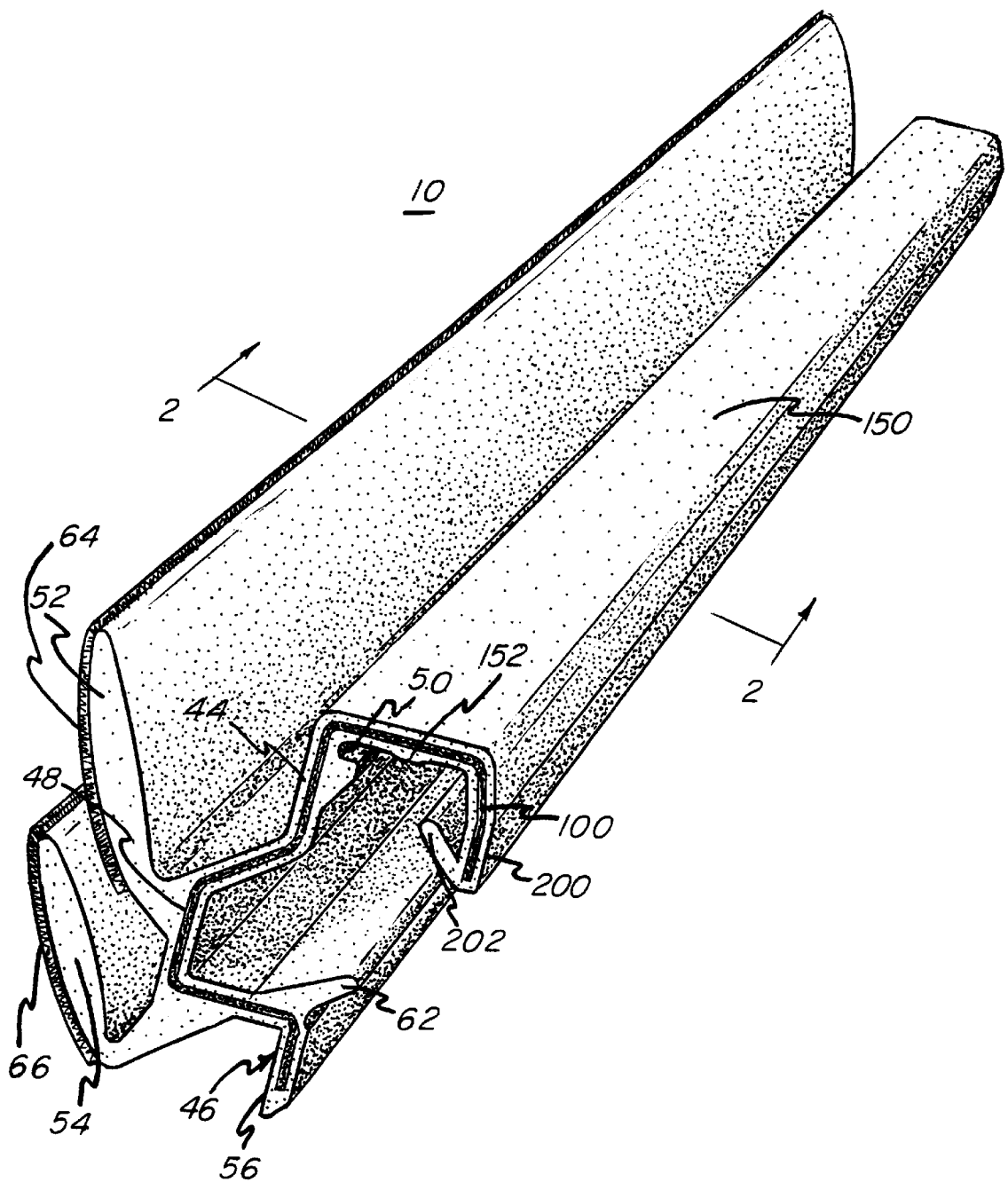
FIG. 1 is a perspective view of the window weatherstrip in accordance with the invention.
Figure 2:
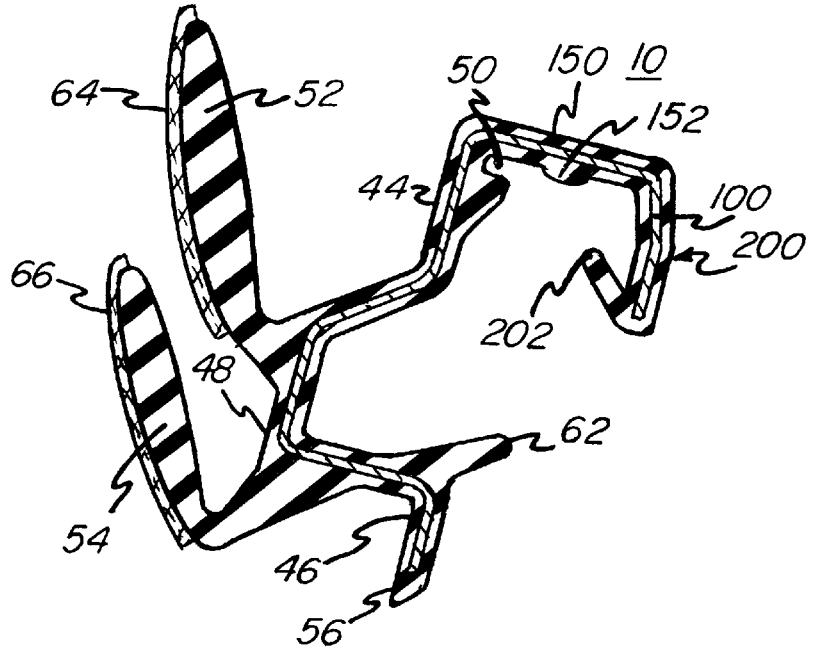
FIG. 2 is a cross-sectional view of the weatherstrip in accordance with the invention taken along the plane represented by the lines and arrows 2—2 in FIG. 1.

Turning now to FIGS. 1 and 2, the weatherstrip 10 may be provided in accordance with conventional extrusion techniques. For example, such techniques are described in U.S. Pat. No. 5,529,650 (of common assignment herewith). The disclosure of this '650 patent application is incorporated by reference herein.

The core member 100 may for example comprise stainless or aluminum. The remainder of the weatherstrip, save for the flocking 64, 66, may be composed of a myriad of different plastic and rubber types such as those disclosed in column 4 of the aforementioned '650 patent. At present, it is preferred to form the core member 100 from a flexible polyvinyl chloride material.

Turning again to FIG. 4, to assemble the weatherstrip 10 over the door frame 12, the anchoring surface 56 of the outer flange is first placed alongside vertically extending rail member 22 of the frame 12. Then, the weatherstrip 10 is pivoted inwardly toward the frame 12 so that the groove 50 and locking bump 152 snap over the horizontally extending mounting flange 14. At this time, the assembly is further supported by means of the interposition of the vertical member 16 between the foot member 62 and hooked portion 202 of the weatherstrip 10. The assembly is easily snap fit into place, and does not require the use of complex fastening mechanisms. Also, the provision of lateral portion 48 of the outer flange 42 which extends toward the window 40, means that the actual mounting structure of the weatherstrip 10 can be placed away from the window 40 with the sealing lips 52, 54 and intermediate offset section 48 bridging the gap between the window 40 and mounting structure. Stated differently, the top portion of the intermediate member 150 is completely hidden from sight.

Although this invention has been described with reference to specific embodiments thereof, it will be appreciated that other modifications of the invention may be made, including the substitution of equivalent components or method steps in substitution for those described.

What is claimed is:

1. A window weatherstrip for sealing along a window of a motor vehicle and adapted to snap fit into place along a door frame mounting structure of the type having a horizontally extending mounting flange and a vertical mounting flange connected to said horizontally extending mounting flange, said weatherstrip comprising:

an inner flange;

an outer flange;

an intermediate portion connecting said inner and outer flange, said intermediate portion adapted to snap fit atop said horizontally extending mounting flange of said door frame mounting structure;

said inner flange extending downwardly from said intermediate portion and having a hooked portion extending inwardly toward said intermediate portion and adapted to bear against a first side of said vertical mounting flange;

said outer flange comprising a top leg portion and a bottom leg portion with an intermediate offset section between said top leg portion and said bottom leg portion, said intermediate offset section being laterally offset from said top leg portion and said bottom leg portion and extending laterally away from said inner flange;

said top leg portion having a groove formed therein located under said intermediate portion and facing said inner flange; said groove extending generally horizontally and adapted for snug receipt therein of said horizontally extending mounting flange;

said bottom leg portion comprising an inwardly facing foot member extending toward said inner flange and adapted to bear against the side of said vertical mounting flange opposite from said side upon which said hooked portion will bear;

a first sealing lip extending from said offset portion and adapted for contacting said window.

2. A window weatherstrip as recited in claim 1 wherein said inner flange is shorter than said outer flange.

3. A window weatherstrip as recited in claim 1 wherein said at least one sealing lip includes first and second sealing lips extending from said intermediate offset section.

4. A window weatherstrip as recited in claim 1 wherein said intermediate portion comprises a locking bump formed therein proximate said top leg portion of said outer flange, said locking bump adapted to bear against a side of said horizontally extending mounting flange.

5. A window weatherstrip as recited in claim 1 wherein said bottom leg portion further comprises a terminal anchoring surface adapted to bear against said mounting structure.

6. A window weatherstrip as recited in claim 5 wherein said anchoring surface comprises a generally planar surface extending at an obtuse angle relative to said foot member.

7. A window weatherstrip for sealing along a window of a motor vehicle and adapted for snap fit mount over a door frame mounting structure having a vertical mounting flange with a first and second side, a horizontally extending mounting flange connected to said vertical mounting flange and extending toward said window, and a vertically extending rail member laterally spaced from said vertical mounting flange, said weatherstrip comprising:

an inner flange;

an outer flange;

an intermediate portion connecting said inner and outer flange, said intermediate portion adapted to snap fit over said horizontally extending mounting flange of said door frame mounting structure;

said inner flange extending downwardly from said intermediate portion and having a hooked portion extending inwardly toward said intermediate portion and adapted to bear against said first side of said vertical mounting flange;

said outer flange comprising a top leg portion and a bottom leg portion, said top leg portion having a horizontally extending groove formed therein located beneath said intermediate portion and facing said inner flange, said groove adapted for snug receipt therein of said horizontally extending mounting flange;

said bottom leg portion comprising an inwardly facing foot member extending toward said inner flange and adapted to bear against said second side of said vertical mounting flange;

said bottom leg portion further comprising an anchoring surface adapted to bear against said vertically extending rail member; and at least one sealing lip extending from said outer flange and adapted for contacting said window.

8. A window weatherstrip as recited in claim 7 wherein said anchoring surface comprises a generally planar surface extending at an obtuse angle relative to said foot member.

9. A window weatherstrip as recited in claim 7 wherein said intermediate portion comprises a locking bump formed thereon proximate said groove.

* * * * *